Patented Mar. 17, 1936

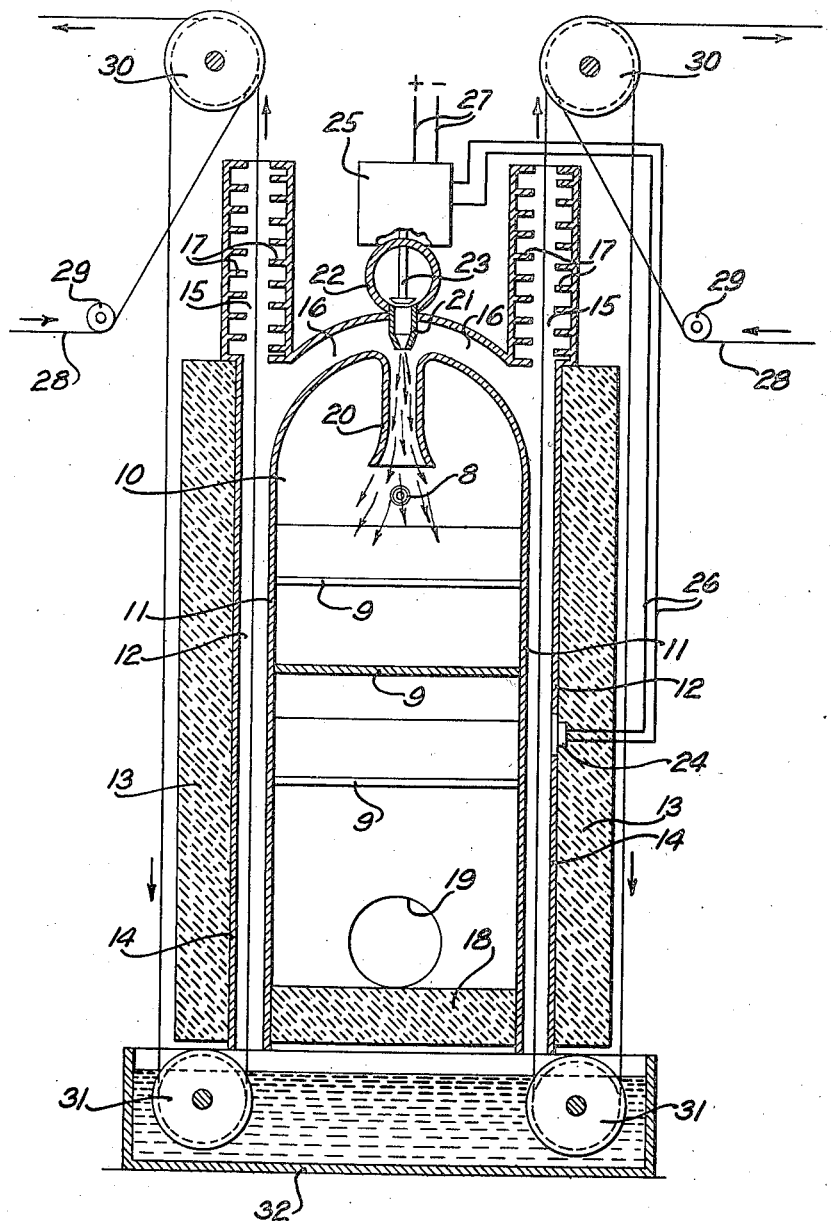

2,034,270

UNITED STATES PATENT OFFICE 2,034,270

APPARATUS FOR TREATING MATERIALS

Raymond L. Reading, Maywood, Ill., assignor to Western Electric Company, Incorporated, New York, N. Y., a corporation of New York Original application October 15, 1931, Serial No. 568,985. Divided and this application December 14, 1933, Serial No. 702,287

7 Claims. (Cl. 91—55)

This invention relates to apparatus for treating materials and more particularly to an apparatus for treating material applied to a filiform core, and is a division of my copending application, Serial No. 568,985, filed October 15, 1931.

An object of the invention is to provide a simple and effective apparatus for heating a coating applied to a filiform core, such as a strand or a ribbon, and in particular for baking a coat of enamel on wire.

One embodiment of the invention is characterized primarily by the use of a combustion chamber and a baking chamber having a common heat transmitting wall. Combustible vapors evolved by heat from a raw enamel coated wire passing through the baking chamber are drawn by the inspirator action of a properly positioned gas jet through a connecting passage and nozzle from the baking chamber into the combustion chamber and there burned to supply heat for the baking chamber. Another feature of the invention is the automatic control of the gas supply to the inspirator by means of a pyrometer or other heat actuated device located preferably in the baking chamber or in some cases in the combustion chamber. Another feature of the invention is the provision of the wire exit passage from the baking chamber with baffles to control the flow of air drawn into the system by the inspirator.

Other objects and features of the invention will be apparent from the following detailed description and from the appended drawing in which the single figure is a schematic, longitudinal, central section of an apparatus embodying the invention.

In carrying out the invention as illustrated in the drawing, there is provided a combustion chamber 10, having side walls 11—11 of any appropriate heat resisting and heat conductive material, such as cast iron, cast aluminum, molded clay, alundum, or the like. These walls 11—11 are also the inner walls of a pair of twin tubular baking chambers 12—12, whose outer walls 13—13 are composed of any appropriate heat insulating material, such as fire brick, asbestos, cement, or the like, and are lined with a smooth heat reflecting lining 14—14 of material similar to that of the walls 11—11. The baking chambers are open at the bottom and at the top open directly into wire exit passages 15—15 and also into a common arched vapor passage 16 formed in the roof of the combustion chamber 10.

The wire exit passages 15—15 are provided with air baffles 17—17 to control the inflow of air through the passages.

The combustion chamber 10 is closed at the bottom by a floor 18 of material similar to that of the walls 13—13, and is provided near the bottom with an exhaust flue 19 to carry combustion products away from the chamber and which may be connected to an exhaust fan, a stack or other draft inducing means. Within the combustion chamber are a plurality of baffles 9 which aid in distributing the hot gases and produce even heating of all portions of the baking chambers.

The lower side of the arched passage 16 is provided, at its crown, with an inspirator nozzle 20 opening from the passage 16 into the chamber 10. In the upper side of the passage 16 is located a pressure gas nozzle 21 opposite to the inspirator nozzle 20 and for coaction therewith. The pressure nozzle 21 communicates with and is fed from a pressure gas main 22 connected to a source (not shown) of gas under pressure. A spark plug 8 or similar means may be provided for initially igniting the combustible mixture in chamber 10.

The flow of gas through the nozzle 21 and consequently the effectiveness of the inspirator 20 is controlled by any suitable means, here shown as a mushroom valve 23, which in turn is automatically controlled by a heat responsive device 24 preferably positioned in a wall of the baking chamber 12. The precise nature of the means by which temperature variations of the device 24 are converted into motions of the valve 23 is not pertinent to the present invention, but such devices for temperature regulation are well known to those skilled in the art and are of many kinds, therefore such device is here indicated merely diagrammatically by a box 25 to contain the device and electrical connections 26 and supply 27.

A wire 28 to be enamelled passes from a supply (not shown) over a tension pulley 29, thence over an idler sheave 30, down outside the apparatus and under an idler sheave 31 immersed in a bath 30 of raw enamel containing a volatile combustible ingredient, such as gasoline, alcohol, acetone, or the like, thence upward through the baking chamber 12, the wire exit passage 15 and over a second idler sheave 30 beside the first to a take-up device not shown.

As the wire coated with raw enamel passes through the lower portion of the chamber 12, the volatile ingredient of the enamel is vaporized by the heat radiated from the wall 11 and reflected from the wall 14, and the residual enamel is baked hard by the heat of the upper portion of the chamber 12. The vapors evolved are drawn up through the chamber 12 and the passage 16 by the inspirator action of the elements 20 and 21 and forced into the combustion chamber 10 where they are burned to provide heat for the baking chamber 12. At the same time air is drawn in through the wire exit passages 15 and mixed with the vapors to supply oxygen for the combustion of the vapors and of the gas from the nozzle 21, and also to cool the counter-moving finished wire.

If conditions require, the gas main 22 may be connected to a supply of pressure air (not shown) as well as to a supply of pressure gas.

Instead of passing only once through the chamber 12, the wire may pass from second sheave 30 to a second sheave 31 on the same shaft and through the chamber 12 a second time to third sheave 30. By a repetition of this arrangement the wire may be given as many successive coats of enamel as may be desired. The baking chambers may be single chambers or comprise a plurality of chambers, each handling the wires from a single supply spool or groups of wires for the various passes, thereby permitting differential baking of the various coats of enamel.

It is obvious that the embodiment of the invention herein illustrated and described is merely illustrative and may be modified in many ways without departing from the scope and spirit of the invention, as defined in the appended claims.

What is claimed is:

1. In an apparatus for treating cores, means to deposit a composition containing a volatile combustible ingredient upon a core, a baking chamber in which the core is heated to vaporize the volatile ingredient, a core exit passage from the chamber, a vapor exhaust passage from the chamber, a combustion chamber, means to draw vapors from the baking chamber and air from the core exit passage and for directing said vapors and air into the combustion chamber, and means in the exit passage to control the flow of air therethrough.

2. In an apparatus for treating cores, means to deposit a composition containing a volatile combustible ingredient upon a core, a baking chamber in which the core is heated to vaporize the volatile ingredient, a core exit passage from the chamber, a vapor exhaust passage from the chamber, a combustion chamber, an inspirator to draw vapors from the baking chamber and air from the core exit passage and for directing said vapors and air into the combustion chamber, and baffles in the exit passage to control the exit flow of air therethrough.

3. In an apparatus for treating cores, means to deposit a composition containing a volatile combustible ingredient upon a core, a baking chamber in which the core is heated to vaporize the volatile ingredient, a combustion chamber associated therewith, means to transfer the vapors from the baking chamber to the combustion chamber, and temperature responsive means to control the effectiveness of the vapor transfer means.

4. In an apparatus for treating cores, means to deposit a composition containing a volatile combustible ingredient upon a core, a baking chamber in which the core is heated to vaporize the volatile ingredient, a combustion chamber, a fuel gas fed inspirator to transfer the vapor from the baking chamber to the combustion chamber and to supply fuel thereto, and temperature responsive means to control the supply of gas to the inspirator.

5. In an apparatus for treating cores, means to deposit a composition containing a volatile combustible ingredient upon a core, a baking chamber in which the core is heated to vaporize the volatile ingredient, a combustion chamber, a fuel gas fed inspirator to transfer the vapor from the baking chamber to the combustion chamber and to supply fuel thereto, and temperature responsive means to control the supply of gas to the inspirator positioned in the baking chamber.

6. In an apparatus for treating cores, means for depositing a composition containing a volatile combustible ingredient upon cores, a plurality of baking chambers, a common combustion chamber, a passage interconnecting the baking chambers, and means in the passage for drawing vapors from the baking chambers into the combustion chamber.

7. In an apparatus for treating cores, means to deposit a composition containing a volatile combustible ingredient upon a core, a baking chamber in which the core is heated to vaporize the volatile ingredient, a core exit passage from said baking chamber, a combustion chamber, and a fuel gas fed inspirator to transfer the vapor from the baking chamber to the combustion chamber, to supply fuel thereto and to draw air through said core exit passage into said combustion chamber.

RAYMOND L. READING.